United States Patent

Jacobson et al.

[11] 3,893,045
[45] July 1, 1975

[54] PULSED CHEMICAL LASER

[76] Inventors: Thor V. Jacobson, 3049 Rue La Foret No. 10; George H. Kimbell, 2650 Boul. Liegereis, both of Ste-Foy, Quebec, Canada

[22] Filed: Dec. 1, 1971

[21] Appl. No.: 203,734

[52] U.S. Cl. .................................... 331/94.5 G
[51] Int. Cl.² ........................................ H01S 3/22
[58] Field of Search .................. 331/94.5; 330/4.3

[56] References Cited
UNITED STATES PATENTS

| | | | |
|---|---|---|---|
| 3,543,179 | 11/1970 | Wilson | 331/94.5 |
| 3,623,145 | 11/1971 | Gregg et al. | 331/94.5 |
| 3,636,472 | 1/1972 | Leonard | 331/94.5 |
| 3,706,942 | 12/1972 | Ultee | 331/94.5 |

OTHER PUBLICATIONS

Deutsch, Molecular Laser Action in Hydrogen and Deuterium Halides, Appl. Phys. Let., Vol. 10, No. 8, (April 15, 1967), pp. 234–236.

Kovacs et al., Visible Laser Action in Fluorine I. Appl. Phys. Let., Vol. 17, No. 1, (July 1, 1970), pp 39 and 40.

Chemical Laser Operates on Rotational-Rotational Transitions, Laser Focus (October 1967), pp. 14 and 16.

*Primary Examiner*—William L. Sikes
*Attorney, Agent, or Firm*—R. S. Sciascia; P. Schneider

[57] ABSTRACT

In the present application there is disclosed a hydrogen fluoride laser capable of operating super radiantly and at atmospheric pressure. A transverse electrical discharge is utilized to energize the reaction of a hydrogen donor to provide hydrogen fluoride in a metastable energy state which reverts to a stable state by laser action. A large range of hydrogen and fluorine donors is disclosed. A preferred pair of donors is sulphur hexafluoride and propane. Helium is frequently added to the gas mix to act as a buffer.

2 Claims, 2 Drawing Figures

PULSED CHEMICAL LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a pulsed chemical laser and in particular to an improved form of hydrogen fluoride laser which provides high pulse energies and high peak powers utilizing the energy liberated during chemical reactions.

2. Description of the Prior Art

Conventional pulsed laser operation in gaseous molecular lasers e.g. $CO_2$, $N_2O$ requires large electrical power supplies. Ultimate efficiencies are limited to about 20%. Attention has recently turned to chemical reactions wherein gaseous materials are caused to react by either pulses of electrical or light energy. The light pulsing technique has proven very inefficient and requires large energy storage devices. Recently, the electrical discharge technique has indicated a high potential and laser action has been achieved at pressures as high as 100 torr. Only scanty information on pulse energies or peak power is available. A sulphur hexafluoride/hydrogen chemical laser energized by a longitudinal electrical discharge is known which has achieved super radiant laser operation at pressures up to 100 torr. Super radiant laser operation is considered to be achieved when the gain per unit length in a single pass through the laser medium is greater than the losses, that is laser oscillations occur with a single pass of the output beam through the medium. Chemical laser action has also been stimulated by electron beam techniques; however such energization requires very complex instrumentation, and equipment for generating beams of high energy electrons. Flash initiated chemical laser systems have also been tried, however these systems require low pressure operation, and electrical efficiencies are frequently less than 0.1%. Longitudinal electrical discharge devices have been operated, however because of difficulties the full extent of which is not yet known, pressures above 100 torr have not been achieved.

SUMMARY OF THE INVENTION

The present invention provides a chemical laser overcoming the deficiencies of known chemical lasers, providing operation at atmospheric pressure and providing a super radiant oscillator. The present invention provides a chemical laser which is electrically triggered by an electrode system placed transversely to the optical axis of the laser cavity, and which operates at atmospheric or ambient pressure providing large pulse outputs of laser energy.

The accompanying drawing illustrates typical apparatus for achieving chemical laser action pursuant to the present invention. The present invention utilizes a non-resistively loaded electrode structure having a pair of electrodes positioned on either side of the optical axis of the laser cavity. One electrode is in the form of a bar of circular cross-section, and the other electrode has a plurality of pins extending toward the first electrode. Multiple transverse electrical discharges are simultaneously initiated between the pin electrodes and the bar. These discharges serve to initiate chemical reactions between the reactive chemical elements or to induce dissociation of one or more of the reactants so as to produce subsequent chemical reactions. The laser cavity contains the electrode array and is provided with an inlet and mixing system for the reactants, an exhaust system for the product species, and an externally mounted mirror system defining the optics of the laser cavity. Such a mirror system may consist of one totally reflecting mirror and a second mirror the reflectance of which is chosen on the basis of optimized performance. The apparatus utilizes mixtures of reactants comprising gases such as fluorine compounds, and hydrogen or deuterium containing compounds. (This type of fluorine compound may be termed "fluorine-rich", i.e., fluorine-saturated, gas. Similarly, the hydrogen compound may be termed "hydrogen-rich" gas. These are gases which will liberate fluorine and hydrogen atoms, respectively, under the influence of an electrical discharge.) Inert gases are frequently included as buffers. These reactants are fed to the laser cavity by a mixing system and chemical reactions are initiated by the transverse electrical discharge which is energized by a high voltage spark discharge system to provide a fast rise-time short duration discharge in the apparatus as illustrated. The ends of the laser cavity are provided with Brewster-angle windows of sodium chloride.

OBJECTS OF THE INVENTION

It is an object of the invention to provide a new and improved pulsed chemical laser.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
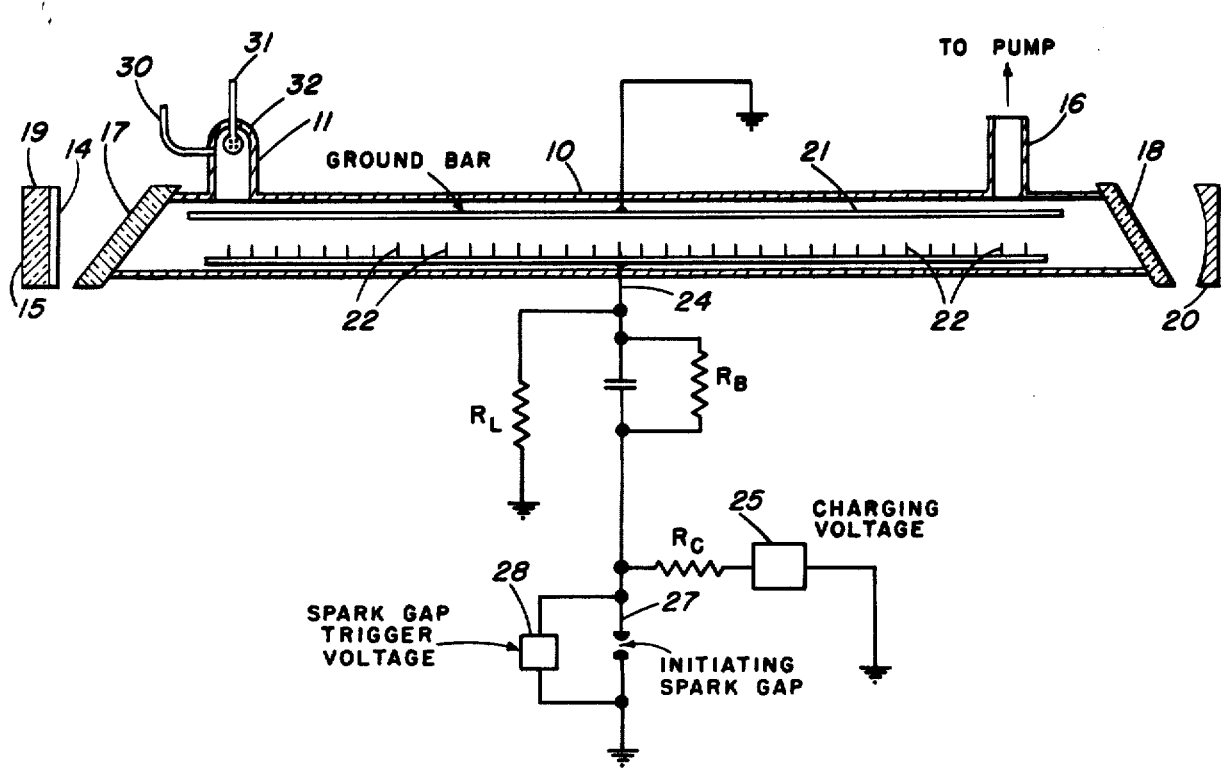
FIG. 1 is a longitudinal section of the present invention.
Figure 2:
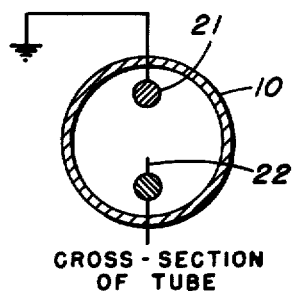
FIG. 2 is a transverse section of the present invention.

Referring to the drawings there is illustrated in schematic form a chemical laser apparatus pursuant to the present invention. A tube 10 of circular cross-section is provided with a gas inlet 11 and an outlet 16 for connection to an exhaust pump (not illustrated). The ends of the tube 10 are closed with sodium chloride Brewster-angle windows 17 and 18, which are substantially transparent at the wavelengths of laser operation. A pair of mirrors 19 and 20 are arranged at either end of the tube 10 to form the optical resonator for the laser cavity. The mirror 19 as illustrated comprises a sodium chloride flat 15 having a selenium coated face 14 to reflect about 65% of the incident laser energy. Depending on the particular laser application one or other of the mirrors 19 and 20 may be either a plane mirror or curved or partially reflective. Alternatively an aperture may be provided in one or other of the mirrors to permit the radiation of the laser output to occur.

An electrode structure is mounted within the tube 10 and consists of a ground bar 21 connected to a suitable external electrical ground and a plurality of pin electrodes 22, connected to a common bus 24.

The electrode system is energized by a high voltage pulse power supply consisting of a source of DC charging voltage 25, which charges electrical capacitor 26 through charging resistor $R_c$ 10 MΩ. Capacitor 26 discharges through spark gap 27, the discharge voltage of the spark gap 27 being set by the spark gap trigger voltage circuit 28. The voltage source 25 may be for example a Universal Voltronics 70 KV DC power supply. The spark gap 27 may be an E G & G model 14B spark gap, and the spark gap trigger 28 may be an E G & G trigger Module. Load resistor $R_L$ having a value of 1 MΩ is connected across the electrodes. A high value resistor $R_B$ is connected across the capacitor 26.

In a specific embodiment of the apparatus used in the above experiments the following were the specific characteristics. A 0.01 μfd capacitor charged to 30 KV wsa discharged through the electrode structure. The individual pin electrode 22 discharged to the grounding bar 21 across a ½ in. gap. The laser cavity was formed by an aluminum mirror having a focal length of 4 m and a selenium-coated NaCl flat of 65% reflectivity at 2.8 microns. Spectroscopic measurements were made with a McPherson Model 218 spectrometer observing individual lines, with a Ge:Au 77°K photo detector. Pulse energies were measured using a calibrated pyroelectric detector. All experiments were conducted in slowly flowing gas, repetitively pulsed at a frequency of 1 Hz.

In operation reactant gases are admitted to the tube 10 through the inlets 30 and 31, are mixed in the mixing chamber 32 and pass through inlet 11 into tube 10. Chemical laser reactions are initiated by electrical discharges from the pin electrodes 22 to the ground bar 21. The chemical reactions produce hydrogen fluoride as one product and release energy which raises the hydrogen fluoride molecules to an excited state. Lasing action occurs as the molecules drop back to a lower-energy level. The product species are removed from the laser through the exhaust 16 and vented to a suitable absorption or disposal apparatus. The flow of gases at the inlets 31 and 32 and the rate of exhaust is controlled to maintain the desired pressure within the tube 16 during operation. Utilizing a mixture of sulphur hexafluoride, propane and helium, super radiant operation has been achieved at pressures from 10 to 760 torr i.e. at atmospheric pressure. Listed below is a table showing some of the chemical constituents successfully utilized in accordance with the present invention in chemical laser operation.

TABLE I

HF LASER: PULSE ENERGY MEASUREMENTS

| Gases | Pressure (torr)* | Mixture | | | Pulse Energy (mJ) | | | Mixture (730 torr) | | | Pulse Energy (mJ) | | |
|---|---|---|---|---|---|---|---|---|---|---|---|---|---|
| | | Fluorine Donor | Hydrogen Donor | He | **35% | one | none | Fluorine | Hydrogen | He | **35% | one | none |
| $C_3F_8 + H_2 + H_e$ | 100 | 1.4:1:6.4 | | | 0.5 | 0.5 | 0.05 | 1.0:1:35 | | | 0.1 | — | — |
| $+ CH_4 + H_e$ | 90 | 2.4:1:9.1 | | | 0.8 | 0.1 | 0 | — | | | — | — | — |
| $+ C_2H_6 + H_e$ | 100 | 2.7:1:11 | | | 0.8 | 0.3 | 0 | 2.9:1:50 | | | 0.05 | — | — |
| $+ C_3H_8 + H_e$ | 40 | 9.0:1:0 | | | 1.1 | 0.4 | 0 | — | | | — | — | — |
| $+ C_4H_{10} + H_e$ | 40 | 16:1:0 | | | 1.1 | 0.4 | 0 | — | | | — | — | — |
| $C_2F_6 + H_2 + H_e$ | 40 | 3.3:1:0 6.9 | | | 2.1 | 1.1 | | 2.9:1:80 | | | 0.4 | — | — |
| $+ CH_4 + H_e$ | 30 | 5.6:1:0 | | | 3.2 | 0.9 | 0.3 | 9.0:1:290 | | | 0.2 | — | — |
| $+ C_2H_6 + H_e$ | 40 | 13:1:0 | | | 6.4 | 3.2 | 0.9 | 16:1:90 | | | 0.3 | — | — |
| $+ C_3H_8 + H_e$ | 40 | 15:1:0 | | | 6.4 | 3.2 | 0.5 | 22:1:540 | | | 0.5 | — | — |
| $+ C_4H_{10} + H_e$ | 40 | 12:1:0 | | | 5.3 | 2.1 | 0.8 | 13:1:530 | | | 1.3 | — | — |
| $CF_4 + H_2 + H_e$ | 35 | 2.8:1:0 | | | 2.6 | 0.05 | 0 | 4.1:1:57 | | | 1.6 | — | — |
| $+ CH_4 + H_e$ | 50 | 18:1:0 | | | 2.2 | 0.3 | 0 | 7.1:1:130 | | | 0.1 | — | — |
| $+ C_2H_6 + He$ | 40 | 17:1:0 | | | 3.1 | 0.5 | 0.05 | 17:1:60 | | | 0.3 | — | — |
| $+ C_3H_8 + He$ | 40 | 21:1:0 | | | 3.9 | 0.6 | 0 | 21:1:360 | | | 1.1 | — | — |
| $+ C_4H_{10} + He$ | 40 | 25:1:0 | | | 5.5 | 1.1 | 0.05 | 50:1:1600 | | | 1.1 | — | — |
| $SF_6 + H_2 + He$ | 40 | 3.6:1:0 | | | 10 | 5 | 0.6 | 3.5:1:37 | | | 1 | 0.05 | — |
| $+ CH_4 + He$ | 50 | 9.5:1:0 | | | 7.5 | 5 | 1.2 | 9.5:1:110 | | | 0.8 | — | — |
| $+ C_2H_6 + He$ | 40 | 21:1:0 | | | 25 | 15 | 4 | 12:1:120 | | | 1.2 | 0.2 | — |
| $+ C_3H_8 + He$ | 115 | 6.4:1:78 | | | 40 | 30 | 10 | 9.5:1:160 | | | 5 | 2 | 0.2 |
| $+ C_4H_{10} + He$ | 50 | 16:1:0 | | | 25 | 15 | 32 | 16:1:150 | | | 1.5 | 0.4 | — |

*Pressures and gas mixtures quoted are those for which maximum pulse energy was observed.
**35% = Cavity formed from concave mirror and 35% reflecting flat.
One = Reflecting flat removed.
None = Back mirror covered.

It should be noted that when sulphur hexafluoride was used as a fluorine donor, that super radiant operation at atmospheric pressure was obtained using only one mirror, and in one case laser operation occurred with no mirrors at all. Super radiant operation was obtained at reduced pressure for the majority of fluorine donor/hydrogen donor combinations.

All of the above gas systems produce lasing action in the 2.8 micron region, and where noted at pressures up to and including atmospheric.

While not wishing to be limited to any particular theory of operation, it would appear that the operation of the chemical lasers pursuant to the present invention involves a chemical reaction in which a hydrogen rich compound (hydrogen donor) is reacted with a fluorine rich compound (fluorine donor) to produce hydrogen fluoride having an inversion, which then undergoes a vibrational-rotational transition to a lower energy state with a stimulated emission of radiation in the 2.8 micron region. It would appear that the use of transverse multiple discharges to energize the chemical reactions enables high pulse energies and peak powers to be obtained. There appears to be a co-relation between the output energy and the spectroscopic output with the exothermicity of the reaction F + RH + HR + H.

It can be seen from Table I that $SF_6$—$C_3H_8$ system is the most efficient combination, giving 40 mJ per pulse. The fluoride donor which gave the highest pulse energies was $SF_6$; greater energy variations were obtained by changing fluorine donors rather than by changing hydrogen donors. In every instance the pulse energy could be increased by increasing the electrical energy input.

Table II shows the vibrational-rotational transitions observed for various fluorine/hydrogen donor systems.

It is also possible that some of the additional energy may be obtained from elimination reactions such as $$F + C_3H_7 \rightarrow C_3H_7F \rightarrow HF + C_3H_6$$

It is, nevertheless, not necessary to postulate this more complex mechanism to explain the $v = 3 \rightarrow v = 2$ transitions.

This technique of pulsing offers high potential for the development of lasers, operating at a variety of infrared frequencies. Deuterated compounds may be substituted for hydrogen donors, for example deuterium may be substituted directly for hydrogen.

TABLE II

HF LASER: SPECTROSCOPIC DATA

| Gases | $SF_6$+$C_3H_8$+He | | | | | | $SF_6$+$H_2$+He | | | | | | $CF_3$+$H_2$ | | | $CF_3$+$C_3H_8$+He |
|---|---|---|---|---|---|---|---|---|---|---|---|---|---|---|---|---|
| | | | | | | | | | | | | | 2.8/ | 4.0/ | 21/ | |
| Used | | | | | | | | | | | | | 1/0 | 1/57 | 1/0 | |
| Mixture | 6.4/1/78 | | | 95/1/160 | | | 2.2/1/33 | | | 2.2/1/26 | | | 50 | 730 | 40 | 21/1/360 |
| Ratio | 115 torr | | | 750 torr | | | 120 torr | | | 750 torr | | | torr | torr | torr | 730 torr |
| Pressure Optics*** | 65% | 1 Mirror | None | 65% | 1 Mirror | None | 65% | 1 Mirror | None | 65% | 1 Mirror | None | 65% | 65% | 65% | 1 Mirror | 65% |
| $P_3(7)$ | W** | | | | | | S | | | | | | | | | | |
| $P_3(6)$ | S | | | | | | | | | | | | | | | | |
| $P_3(5)$ | S | W | W | | | | S | S | | | | | | | M | | |
| $P_3(4)$ | S | S | W | | | | S | S | VW | | | | | | M | | |
| $P_3(3)$ | W | | | | | | S | W | | | | | | | W | | |
| $P_2(9)$ | W | | | | | | | | | | | | | | | | |
| $P_2(8)$ | S | M | | | | | S | S | | | | | M | | M | | |
| $P_2(7)$ | S | M | VW | | | | S | S | VW | | | | M | | S | VW | |
| $P_2(6)$ | S | S | W | | | | S | S | VW | | | | S | VW | VS | VS | |
| $P_2(5)$ | S | S | W | M | VW | | S | S | M | M | W | | M | W | VS | S | S |
| $P_2(4)$ | M | S | M | S | S | W | S | S | M | M | M | VW | M | M | M | M | VS |
| $P_2(3)$ | W | S | M | M | S | W | S | M | | M | M | W | VW | M | M | M | VS |
| $P_1(8)$ | S | | | | | | S | W | | | | | M | | W | | |
| $P_1(7)$ | S | S | VW | | | | S | S | M | | | | S | | S | M | M |
| $P_1(6)$ | S | S | M | | | | S | S | W | | | | WW | | M | VS | |
| $P_1(5)$ | W | W | M | M | | | M | M | M | W | M | VW | | W | VW | | W |
| $P_1(4)$ | S | S | M | M | S | | | | W | S | M | VW | | M | | | |
| $P_1(3)$ | | | | | VW | | | | W | | | | | | | | |

This notation $P_v(J)$ is used where P refers to the P vibrational-rotational band, v refers to the upper vibrational level, and J refers to the rotational energy level at (v − 1).
VW = Very Weak, W = Weak, M = Medium, S = Strong Slit widths were adjusted from one column to another. Only comparisons in a column are meaningful.
65% = Gravity formed from concave mirror and 65% reflecting flat.
1 Mirror = Reflecting flat removed.
None = Back mirror covered.

Both the $SF_6$ — $C_3H_8$ and the $SF_6$ — $H_2$ systems permit lasing on transitions as high as $P_3(7)$.

In the reaction $$F + H_2 = HF + H$$

34.7 Kcal are available to the reaction products, the reaction likely predominates in the $SF_6$ — $H_2$ case, e.g. $P_2$ corresponds to 25.3 Kcal. The $P_3$ ($u$) transition observed with $SF_6$ — $C_3H_8$ corresponds to 35.7 Kcal. This higher energy appears to be a reflection of the R—H bond dissociation energy, e.g. $D_o$ (n-propyl-H) = 98 Kcal, $D_o$ (i-propyl-H) = 94.5 Kcal. (These numbers would be the same for n-butyl-H and i-butyl-H). Thus the reaction $$F + RH \rightarrow HF + R$$

can be exothermic by as much as 40.3 Kcal for the i-propyl-H abstraction. This exothermicity is, therefore, sufficient to explain all the transitions observed and it is not necessary to include the reaction $$H + SF_6 \rightarrow SF_5 + HF + 63 \text{ Kcal}$$

What is claimed is:
1. A laser comprising, in combination:
a gastight longitudinal cavity having a longitudinal axis therethrough;
an optical responator comprising light reflecting means located on the longitudinal axis at opposite ends of the cavity, one of said reflecting means also having means to permit light to pass therethrough;
multiple transverse pin electrodes located within said cavity on transversely opposite sides of said longitudinal axis, said electrodes having terminals outside said cavity for connection to means for initiating an electrical discharge therebetween, the direction of discharge being transverse to the longitudinal axis and the discharge from all electrodes being simultaneous;
means providing a mixture of a hydrogen-rich gas and a fluorine-rich gas to said laser cavity, said gases being of a type which chemically react with each other, when exposed to an electrical discharge, to produce a hydrogenfluorine gas com- pound having hydrogen fluoride molecules which are in an excited state, so that spontaneous lasing action occurs; and means for exhausting the reaction products of said chemical reaction from said cavity, said gaseous mixture comprising 6.4 to 9.5 parts of $SF_6$, 1 part of $C_3H_8$, and 0 to 160 parts of He.

2. A laser comprising, in combination:

a gastight longitudinal cavity having a longitudinal axis therethrough;

an optical responator comprising light reflecting means located on the longitudinal axis at opposite ends of the cavity, one of said reflecting means also having means to permit light to pass therethrough;

multiple transverse pin electrodes located within said cavity on transversely opposite sides of said longitudinal axis, said electrodes having terminals outside said cavity for connection to means for initiating an electrical discharge therebetween, the direction of discharge being transverse to the longitudinal axis and the discharge from all electrodes being simultaneous;

means providing a mixture of a hydrogen-rich gas and a fluorine-rich gas to said laser cavity, said gases being of a type which chemically react with each other, when exposed to an electrical discharge, to produce a hydrogenfluorine gas compound having hydrogen fluoride molecules which are in an excited state, so that spontaneous lasing action occurs; and means for exhausting the reaction products of said chemical reaction from said cavity, said gaseous mixture comprising 9.5 parts of $SF_6$ to 1 part of $C_3H_8$ to 160 parts of He.

* * * * *